(12) United States Patent
Mitsuoka et al.

(10) Patent No.: US 6,881,947 B2
(45) Date of Patent: Apr. 19, 2005

(54) NEAR-FIELD OPTICAL PROBE

(75) Inventors: Yasuyuki Mitsuoka, Chiba (JP); Norio Chiba, Chiba (JP); Nobuyuki Kasama, Chiba (JP); Takashi Niwa, Chiba (JP); Kunio Nakajima, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 10/339,074

(22) Filed: Jan. 9, 2003

(65) Prior Publication Data

US 2003/0141444 A1 Jul. 31, 2003

Related U.S. Application Data

(62) Division of application No. 09/402,382, filed as application No. PCT/JP99/00514 on Feb. 5, 1999, now Pat. No. 6,528,780.

(30) Foreign Application Priority Data

Feb. 5, 1998 (JP) .......................................... 10-024801

(51) Int. Cl.$^7$ ................................................. H01J 3/14
(52) U.S. Cl. ..................................... 250/216; 250/306
(58) Field of Search ................................ 250/216, 306, 250/307, 234, 227.14, 227.11; 73/105; 347/258, 257; 369/112.23, 112.25, 126

(56) References Cited

U.S. PATENT DOCUMENTS

| | | | | | |
|---|---|---|---|---|---|
| 5,294,790 | A | * | 3/1994 | Ohta et al. | 250/216 |
| 6,046,972 | A | * | 4/2000 | Kuroda et al. | 369/126 |
| 6,215,114 | B1 | * | 4/2001 | Yagi et al. | 250/216 |

* cited by examiner

Primary Examiner—Kevin Pyo
(74) Attorney, Agent, or Firm—Adams & Wilks

(57) ABSTRACT

The present invention has an object, in a near-field optical probe having a microscopic aperture to generate and/or scatter a near field, to obtain a near-field optical probe easy to be made in an array which increases the intensity of a near field to be generated and/or scattered and is adapted for use as an optical memory head.

This near-field optical probe is arranged with a planar lens having microscopic lens on a flat surface substrate having an inverted conical or pyramidal hole formed therethrough such that its apex is made as the microscopic aperture, wherein a light source is further arranged thereon to introduce light to the planar lens. Because the arrangement is made such that the planar lens has a focal point positioned at the microscopic aperture, the light given by the light source can be efficiently collected to the microscopic aperture. Also, the above structure can be arrayed and mass produced using a silicon process, thus being adapted for use as an optical memory head.

8 Claims, 6 Drawing Sheets

NEAR-FIELD OPTICAL PROBE

CROSS-REFERENCE TO RELATED APPLICATION

This application is a division of application Ser. No. 09/402,382 filed Jun. 26, 2000, now U.S. Pat. No. 6,528,780, which is a U.S. national stage application of copending International Application Ser. No. PCT/JP099/00514, filed on Feb. 5, 1999 claiming a priority date of Feb. 5, 1998, and published in a non-English language.

The present invention relates to a near-field optical probe capable of reproducing and recording information with high density utilizing a near field, and more particularly to near-field optical probes that are arranged in an array.

The typical optical microscope used for observing an optical characteristic distribution of a sample cannot realize structural observation with a resolving power of less than half of its wavelength due to a diffraction limit of visible light used for illuminating the sample, i.e. propagated light. Consequently, in the optical microscope the minimum unit for analyzing sample structure is limited to several hundreds of nanometers. However, because images are obtainable as extended visual observation, analysis simplification and microscope structural simplification were achieved.

On the other hand, in the electron microscope capable of sample surface observation with higher resolving power, because an electron beam with high energy is irradiated on a sample surface to be observed, there has been a trend of damaging a sample or increasing the size of the microscope and its complexity.

Also, as for the scanning tunnel microscope (STM) capable of obtaining images with even higher resolution or the scanning probe microscope (SPM) represented by the atomic force microscope (AFM), atomic and molecular images on a sample surface re obtainable and size reduction has been achieved for the units constituting the microscope. However, the physical quantity to be detected is by an interaction, such as a tunnel current or atomic force, caused between a probe and a sample surface. The obtained resolving power on surface geometric image is dependent upon a probe tip shape.

Under such situation, attention has now been drawn to the near-field optical microscope which utilizes propagated light and detects an interaction occurring between a probe and a sample surface on a near field basis to thereby break through the propagation light diffraction limit as encountered in the above-mentioned optical microscope and adopts the SPM apparatus structure.

In the near-field optical microscope, a probe having a microscopic aperture smaller than a wavelength of the propagated light used in observation causes scattering in a near field occurring on a light illuminated sample surface. By detecting the scattered light, observation on a smaller microscopic region is made possible exceeding the resolving power of optical microscope observation. Also, by sweeping the wavelength of light illuminated on the sample surface, a sample optical property may be observed in a microscopic region.

For a near-field optical microscope, an optical fiber probe is usually used which has a microscopic aperture formed in the tip of an optical fiber by sharpening and coating the periphery with a metal. The scattered light caused due to an interaction with a near field is passed through a probe interior and introduced to a light detector.

Also, light is introduced through the optical fiber probe toward a sample to generate a near field at an optical fiber probe tip portion. It is also possible to introduce the scattered light caused due to an interaction between the near field and a sample surface microscopic texture to the light detector by using a further added light collecting system.

Further, besides the utilization as a microscope, it is possible to locally generate a high energy density near field on a sample surface by introducing light toward the sample through the optical fiber probe. This makes it possible to change a texture or property of the sample surface and realize a high density memory. In such a case, the recorded information can be recorded/reproduced by including a modulation of a wavelength or intensity of light to be illuminated on the sample in the above-mentioned near-field detecting method.

There is proposed, as a probe used for a near-field optical microscope, a cantilever type optical probe in which an aperture portion is formed penetrating through a silicon substrate by a semiconductor manufacturing technology such as photolithography, an insulation film is formed on one surface of the silicon substrate, and a conical formed optical waveguide layer is formed on the insulation film on an opposite side to the aperture portion, for example, as disclosed for example in U.S. Pat. No. 5,294,790. In this cantilever type optical probe, it is possible to transmit light through the formed microscopic aperture by inserting an optical fiber in the aperture portion and coating with a metal film at areas except for a tip portion of the optical waveguide layer.

Furthermore, the aperture portion of the cantilever type optical probe is provided with a ball lens or a lens forming resin in order to collect the light from the inserted optical fiber on the optical waveguide layer tip.

Meanwhile, there is known a cantilever type optical waveguide probe which uses an optical waveguide instead of an optical fiber inserted in a cantilever type optical probe as by the aforesaid U.S. Pat No. 5,294,790. For example, the cantilever disclosed in U.S. Pat. No. 5,354,985 is structured with a capacitor layer formed to utilize the AFM technology together with an optical waveguide for introducing light to an aperture so that the cantilever can be detected in vibration and flexure amount.

Furthermore, according to the cantilever type optical waveguide probe, laser is illuminated to a cantilever surface. The above mentioned capacitor layer or a piezoelectric resistance layer is omitted such that the AFM technology of detecting a cantilever flexure amount is utilized by the reflection position. Further, a concave formed lens or Fresnel zone plate is formed in an aperture direction on the optical waveguide, and light introduced from the optical waveguide can be collected toward the aperture.

Furthermore, there is also a proposal to use a flat surface probe without having a sharpened tip like the above-mentioned probe. The flat surface probe has an inverted pyramid structured aperture formed in a silicon substrate by anisotropic etching. Particularly, its apex is penetrated by having a diameter of several tens of nanometers. In such a flat plane probe, it is easy to form a plurality on the same substrate, i.e., in an array, by the use of a semiconductor manufacturing technology. In particular, it is possible to use as an optical head suited for optical memory reproduction recording utilizing a near field. By attaching the above-mentioned ball lens in an aperture portion of this flat plane probe, it is possible to collect the light introduced to a flat plane probe surface onto an aperture its portion.

However, the optical fiber probe explained above has a sharpened tip, and accordingly is not sufficient in mechanical strength and not suited for mass production and arraying. Also, because the scattered light is to be detected through an optical fiber, there is a necessity of devising a way to obtain a sufficient amount of light at a detecting portion. Also, where creating a sufficiently large near field through an optical fiber, there is a necessity of devising a way to collect light to the aperture.

Also, in the cantilever type optical probe explained above, because an optical fiber is inserted to the aperture portion to achieve reception of the scattered light from the optical waveguide layer or introduction of the propagated light to the optical waveguide layer, a sufficient amount of light could not be propagated without loss between the optical waveguide layer and the optical fiber.

Furthermore, where a ball lens is provided in the aperture portion, the ball lens cannot necessarily adjust a focal point to a light inlet/outlet surface of the optical fiber or an optical waveguide layer tip portion, thus making it impossible to effect optimal light collection.

Also, in the cantilever type optical waveguide probe explained above, there is a similar problem between the propagation light to the optical waveguide and the optical detector or the propagation light from a light source, to the case of using a cantilever type optical probe as stated above.

The cantilever type optical probe and the cantilever type optical waveguide probe are both difficult to realize particularly arraying in two dimensional arrangement. Also, there are not considered on optical memory information recording/reproduction because of an inherent purpose of utilization as a microscope. High speed scan is difficult over a recording medium.

The flat plane probe explained above is suited for mass production and arraying. Because there is no projected sharpened portion, mechanical strength is sufficient. However, because light collection is achieved by providing a ball lens in the aperture portion, there is a similar problem to the use of a ball lens in the cantilever type optical probe.

Therefore, it is an object of the present invention to provide a probe capable of detecting and creating a sufficient intensity of a near field, in a probe having a conventional microscopic aperture as described above, particularly a near-field optical probe as an optical memory head suited for mass production and arraying in order to realize optical memory information recording/reproduction utilizing a near field.

SUMMARY OF THE INVENTION

A near-field optical probe according to the present invention is characterized by a near-field optical probe having a microscopic aperture to generate/scatter a near field, the near-field optical probe including: a flat surface substrate having an inverted conical or pyramidal hole formed penetrating therethrough such that an apex portion thereof serves as the microscopic aperture; a planar lens having a microscopic lens; a light source for emitting light to the planar lens, wherein in the flat plate substrate the flat planar lens is arranged on a surface opposite to a surface where the microscopic aperture is formed to position a focal point of the lens at the microscopic aperture; the light source being arranged above a surface of the planar lens.

Accordingly, the light emitted from the light source can be efficiently collected at the microscopic aperture by the operation of the planar lens positioned above the microscopic aperture. Thus an optical probe is provided which can increase a near field to be generated but is compact in structure.

Also, an ear-field optical probe according to the present invention is characterized in that the flat surface substrate has the microscopic aperture provided in plurality, the planar lens having a plurality of microscopic lenses to be adapted to accommodate for the plurality of microscopic apertures, and the light source is at least one adapted to accommodate for the plurality of microscopic lenses.

Accordingly, the light emitted by the light source can be efficiently collected at the microscopic aperture by the operation of a plurality of planar lenses positioned above the plurality of microscopic apertures in a manner adapted therefor. Where the near-field optical probe according to the present invention is used as an optical memory head, an optical probe is provided which is capable of recording/reproducing information without requiring high speed scanning of the probe.

A near-field optical probe according to the present invention is characterized in that the planar lens has a gradient refractive index.

Accordingly, it is possible to provide a compact structured optical probe having a lens portion in a flat plane form as a planar lens arranged above the microscopic aperture and adapted for mass production.

A near-field optical probe according to the present invention is characterized in that the planar lens has a surface partly made in a lens spherical surface.

Accordingly, it is possible to provide a compact structured optical probe having a microscopic lens portion capable of giving an effect of an ordinary lens form as a planar lens arranged above the microscopic aperture and adapted for mass production.

A near-field optical probe according to the present invention is characterized in that the planar lens is a lens utilizing diffraction.

Accordingly, it is possible to provide a compact structured optical probe having a lens portion with a flat surface as a planar lens arranged above the microscopic aperture and adapted for mass production.

A near-field optical probe according to the present invention is characterized in that the planar lens is arranged inside the inverted conical or pyramidal hole.

Accordingly, it is possible to provide a further compact structured optical probe having a lens positioned immediately in front of the microscopic aperture and adapted for mass production.

A near-field optical probe according to the present invention is characterized in that a cantilever is arranged in place of the flat surface substrate to have an optical waveguide formed with a microscopic aperture at a projection, the planar lens being arranged adapted to a light incident surface of the optical waveguide.

Accordingly, the light emitted by the light source can be efficiently collected at the microscopic aperture by the operation of the planar lens positioned above the microscopic aperture. Thus an optical probe can be provided which can increase a near field to be generated but is applicable with a technology using a conventional cantilever type optical probe.

Also, a near-field optical probe according to the present invention is characterized by a near-field optical probe having a microscopic aperture to generate/scatter a near field, the near-field optical probe including: a flat surface substrate having an inverted conical or pyramidal hole formed penetrating therethrough such that an apex portion thereof serves as the microscopic aperture; a light collecting layer having a plurality of mirrors to introduce incident light to the microscopic aperture; a light source for emitting light to the light collecting layer, wherein in the flat plate substrate the light collecting layer is arranged on a surface opposite to a surface where the microscopic aperture is formed to position a focal point thereof at the microscopic aperture; the light source being arranged above a surface of the light collecting layer.

Accordingly, the light emitted by the light source can be efficiently collected at the microscopic aperture by the operation of the light collecting layer positioned above the microscopic aperture. Thus an optical probe can be provided which can increase a near field to be generated but is compact in structure.

Also, a near-field optical probe according to the present invention is characterized in that a cantilever is arranged in place of the flat surface substrate to have an optical waveguide formed with a microscopic aperture at a projection, the light collecting layer being arranged adapted to a light incident surface of the optical waveguide.

Accordingly, the light emitted by the light source can be efficiently collected at the microscopic aperture by the operation of the light collecting layer positioned above the microscopic aperture. Thus an optical probe can be provided which can increase a near field to be generated but is applicable with a technology using a conventional cantilever type optical probe.

Also, a near-field optical probe according to the present invention is characterized in that a light detector is arranged in place of the light source to detect scattering light scattered at the microscopic aperture.

Accordingly, the scattering light emitted by the microscopic aperture can be efficiently collected at the light detector by the operation of the planar lens or the light collecting layer positioned above the microscopic aperture. Thus an optical probe can be provided to which can increase in detected scattering light but is compact in structure.

BEST MODE FOR CARRYING OUT THE INVENTION

Hereinunder, embodiments of near-field optical probes according to the present invention will be explained in detail based on the attached drawings.

[Embodiment 1]

Figure 1A:
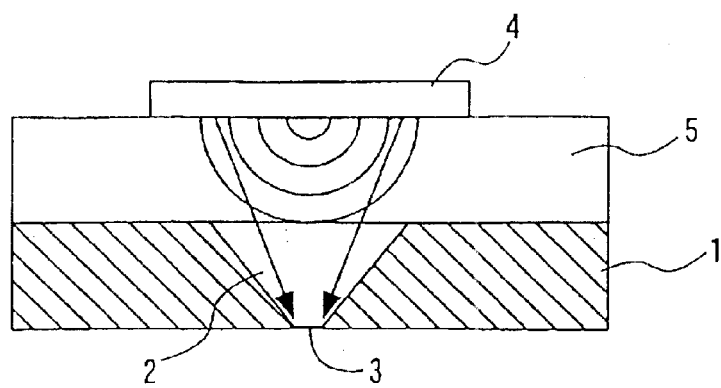
FIG. 1A is a sectional view of a near-field optical probe according to Embodiment 1 of the present invention.

FIG. 1A shows a sectional view of one part of a near-field optical probe according to Embodiment 1.

In FIG. 1A, a silicon substrate 1 with an aperture 3 has a planar microlens 5 wherein a surface emitting laser 4 is further provided on the planar microlens 5.

The silicon substrate 1 is formed with a taper portion 2 in a manner penetrating through it, to have a microscopic aperture 3. The aperture 3 has a diameter, for example, of 50 nanometers so that a near field can be generated by the light introduced through the taper portion 2. The taper portion 2 is formed by microlithography using conventional photolithography or silicon anisotropic etching. For example, a silicon substrate 1 having a (100) plane at both surfaces is formed by thermal oxide films or Au/Cr metal films as masks for anisotropic etching to be subsequently conducted. The mask on one of the surfaces is partially removed to form an aperture window, thereby exposing the (100) plane. Subsequently, the surface formed with the aperture window is exposed to an etch solution, to form a four-walled taper of an inverted pyramid configuration in the silicon substrate 1. Simultaneously, a backside of the mask on the other surface is exposed so that a tip of that is formed into an aperture 3. Next, the mask materials on the both surfaces of the silicon substrate 1 are removed, thereby obtaining a silicon substrate 1 having a desired aperture 3 and formed with the taper portion 2.

Consequently, because a microscopic aperture can be formed by a technology used for a semiconductor manufacturing process as above, a silicon substrate having such an aperture can be utilized as a planar probe capable of producing a near field and is suited for mass production with high reproducibility. In particular, arraying of the taper portions is facilitated so that a plurality of apertures may be formed on the same silicon substrate.

The planar microlens 5 possesses a gradient refractive index the index of refraction continuously varies from one surface of the plate to the other surface, and functions as a lens capable of collecting or collimating the incident light to one surface of the plate on the opposite surface side.

The planar microlens 5 with a gradient refractive can be formed in plurality on the same flat plate, and is suited for the same flat plate, and is suited for the above-mentioned arrayed apertures formed in the silicon substrate.

Figure 1B:
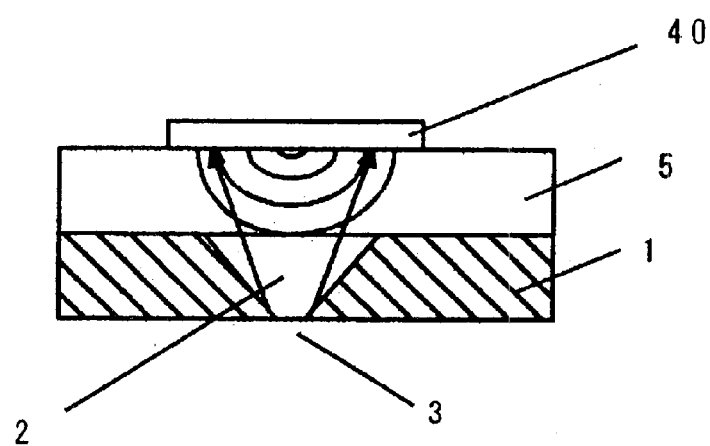
FIG. 1B is a sectional view of a modified form of the near-field optical probe according to Embodiment 1.

FIG. 1B shows a sectional view of one part of a near-field optical probe according to a modified form of Embodiment 1 in which a photodetector 40 is disposed on the planar lens 5 in place of the surface emitting laser 4. In other respects. the construction of near-field optical probe is the same as that shown in FIG. 1A. In FIG. 1B. the near-field optical probe functions in the collection mode and detects near-field light passing through the aperture 3.

Figure 2A:
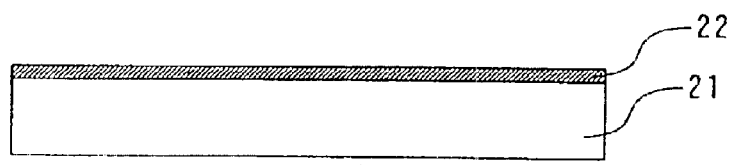
FIGS. 2A, 2B, 2C and 2D are views for explaining a method for fabricating a planar microlens according to Embodiment 1 of the present invention.
Figure 2B:
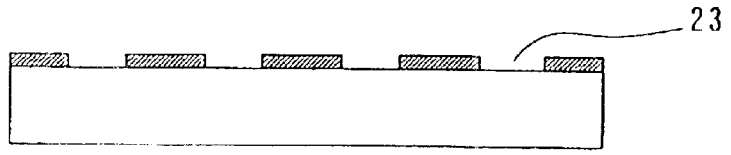
Figure 2C:
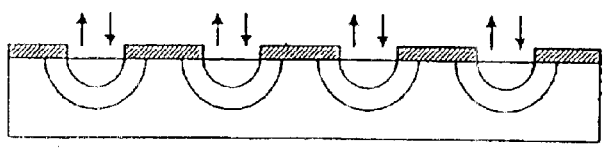
Figure 2D:
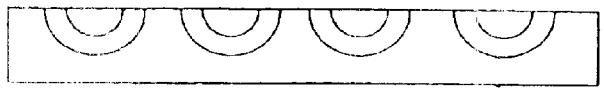

FIGS. 2A, 2B, 2C and 2D show a manufacturing method for a planar microlens 5 having a gradient refractive index. First, as shown in FIG. 2A, a metal film 22 is formed on a glass substrate 21 by vacuum evaporation or sputtering. Subsequently, as shown in FIG. 2B, circular apertures 23 are formed by photolithography. Next, as shown in FIG. 2C, the glass substrate 21 is immersed in a molten salt to effect selective ion exchange. At this time, high electronic polarizability of ions are selected as ions for diffusion into the glass substrate. The diffusion restricted by the circular apertures 23 forms a three dimensional distribution of concentration while advancing to a periphery of the apertures, causing a gradient refractive index in proportion thereto. Thus, a plurality of lenses are realized as shown in FIG. 2D. Each lens is a lens having a distribution of refractive index in a hemispherical form of point symmetry with a maximum refractive index at a center of the circular aperture.

The planar microlens 5 is mounted on the silicon substrate 1 such that in this manner the light incident to the planar microlens 5 with a plurality of lens portions is collected at the respective apertures of the above-mentioned silicon substrate. On this occasion, the silicon substrate 1 and the planar microlens 5 are laminated together using, for example, an organic adhesive.

Incidentally, the manufacturing method for the planar micro lens 5 may be not by the above-mentioned selective ion exchange but by other method, e.g., a CVD technique.

A surface emitting laser 4 is provided as a light source on a surface of the planar microlens 5, i.e. the surface on which external light incident. The light emitted by the surface emitting laser comes into the planar microlens 5. The incident light undergoes an effect similar to a lens by the gradient refractive index possessed by the planar microlens 5, and collected on the aperture 3 of the silicon substrate 1 arranged under the planar microlens 5. Due to the light collection, locally high energy light is collected to increase the intensity of a near field generated in the aperture 3.

Next, explained is a method for effecting optical recording by a near field generated in an aperture 3, wherein a structure overlaid with a silicon substrate 1, a planar microlens 5 and a surface emitting laser 4 is used as a head for an optical memory on a recording medium.

A disc formed flat substrate, for example, is used as a recording medium, on which is placed the optical memory head made in array. In order to act a near field generated in the aperture of the optical memory head on the memory medium, the aperture and the recording medium have to be brought close together to an extent of a diameter of the aperture. Due to this, a lubricant is charged between the optical memory head and the recording medium to form an optical memory head sufficiently thin whereby the spacing between the optical memory head and the recording medium can be kept sufficiently small by utilizing the surface tension of the lubricant. Further, it is possible to follow deflection of the recording medium.

Incidentally, the close state of the optical memory head and the recording medium may be controlled by an air bearing instead of the above-mentioned lubricant, similarly to a flying head used in hard disc technology.

Where the material used as a recording medium is, for example, of a material applied with a phase change recording method, recording uses an optical energy heat mode. Accordingly, the increase in density of light is an important factor. Consequently, in the case of optical recording utilizing a near field, a sufficiently intense near field is desired. In the optical memory head according to the present invention, intensification of the near field is achieved by operation and effect of the planar microlens.

The above explanation was made of a so-called a illumination mode in a near-field optical microscope, wherein light is collected in an aperture of an optical memory head to generate a near field. However, the near-field optical probe of the present invention is effective for a so-called collection mode in which the microscopic aperture detects a near field caused by a microscopic information recording structure on a recording medium surface by irradiating light on the recording medium surface by irradiating light on the recording medium surface by other optical systems. In such a case, the near field detected by the aperture is converted by scattering light and introduced to a surface of the planar microlens. Because, the planar microlens functions as a collimate lens, an optical detector must be provided in place of the surface emitting laser on the surface of the planar microlens.

Also, in the near-field optical probe of the present invention as an optical memory head, it is possible to arrange a plurality of apertures and light-collecting planar microlens. This makes it possible to suppress to a minimum head scan on a recording medium, enabling high speed optical recording and read out. Furthermore, a trackless recording device is realized by conforming the aperture and microlens spacing to an information recording unit spacing of the recording medium.

Incidentally, in the above explanation, the planar microlens 5 was arranged on the top surface of the silicon substrate 1. Alternatively, $SiO_2$ that corresponds to a glass substrate of the planar microlens 5 may be for example laid in the taper portion 2 formed in the silicon substrate 1 so that this is given a gradient refractive index by selective ion exchange to be made into a lens. In this case, the surface of SiO2 to be laid is not required to be in a flat plane but may be a curved plane as long as it is in the taper portion 2. Also, it may have a usual lens form to posses both a lens effect due to that form and a lens effect due to a gradient refractive index.

[Embodiment 2]

Figure 3:
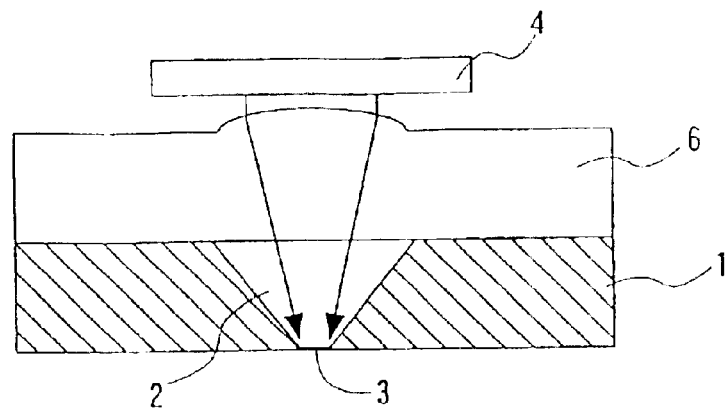
FIG. 3 is a sectional view of a near-field optical probe according to Embodiment 2 of the present invention.

FIG. 3 shows a sectional view of one part of a head for an optical memory according to Embodiment 2.

In FIG. 3, a microlens substrate 6 is arranged in place of the planar microlens 5 of FIG. 1 explained in Embodiment 1.

In the microlens substrate 6, in a selective ion exchange method similar to that explained in Embodiment 1, ions large in radius are diffused into the glass substrate and are selected to cause a swell at a circular aperture portion due to a difference in diameter of ions to be exchanged. Accordingly, a lens is made in a usual lens shape, different from the gradient refractive index created as a result of selective ion exchange in Embodiment 1. Due to this swell, the microlens substrate 6 is not flat in its surface so that surface emitting laser 4 cannot be arrange directly thereon. Consequently, there is a necessity to provide a distance between the microlens substrate 6 and the surface emitting laser 4. A not-shown spacer is used in fixing them.

For the microlens substrate 6 to be formed by such selective ion exchange, the lens portion is easy to be made in an array and can be adapted to apertures of the silicon substrate also made in an array.

Incidentally, the lens making in a usual lens shape with such a swell may be not by the electrive ion exchange mentioned before but by other method, e.g. a glass ceramics method in which an ultraviolet ray is radiated to a photosensitive glass to form a crystallized region and microscopic spherical surface thereby making a lens.

In the microlens substrate 6 made as above, in an illumination mode, it is possible to collect the light emitted by the surface emitting laser 4 at the aperture 3 of the silicon substrate 1, similarly to the planar microlens effect in Embodiment 1. In a collection mode having a light detector in place of the surface emitting laser 4, the scattering light given through the aperture 3 can be collimated on the light detector.

As a consequence, the near field to be generated and detected can be increased in intensity. Particularly where using as a head for an optical memory a structure having in array the silicon substrate 1, microlens substrate 6 and surface emitting laser 4 (or light detector), optical information recording/reproducing utilizing a near field is achieved with high efficiency and reproducibility similarly to the effect as was explained in Embodiment 1.

Incidentally, the microlens substrate 6 may be formed having a lens shape in a surface and a gradient refractive index within the glass substrate by combining the selective ion exchange method to select ions large in electric polarizability explained in Embodiment 1 and the selective ions to select ions large in ion radius explained in Embodiment 2.

[Embodiment 3]

Figure 4:
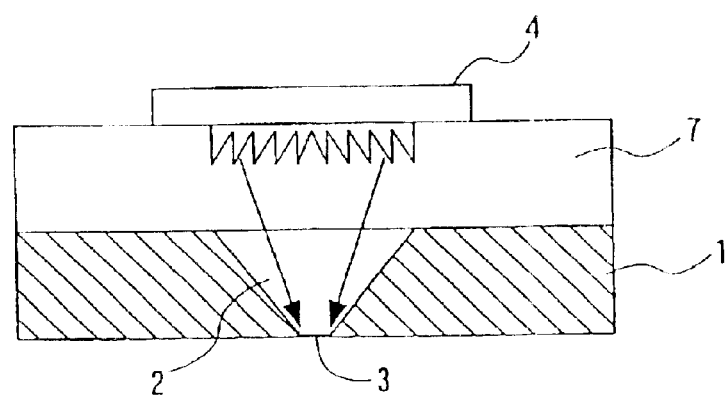
FIG. 4 is a sectional view of a near-field optical probe arranged with a Fresnel zone plate in Embodiment 3 of the present invention.

In FIG. 4, a Fresnel zone plate 7 is arranged in place of the planar microlens 5 of FIG. 1 explained in Embodiment 1. The Fresnel zone plate 7 is used to create diffraction light by a fine pattern on a glass substrate to cause a lens effect. It is possible to collect the coherent light given from the surface emitting laser 4 in the aperture 3 without aberration. The fine processing for the Fresnel zone plate 7 can use various method including electron beam processing, laser interference method, dry etching method and fine machining. However, if a master is made, mass production is possible by stamping or the like.

The provision of a Fresnel zone plate between the surface emitting laser as a light source and the aperture can increase the intensity of a near field to be generated or detected in the aperture.

Figure 5:
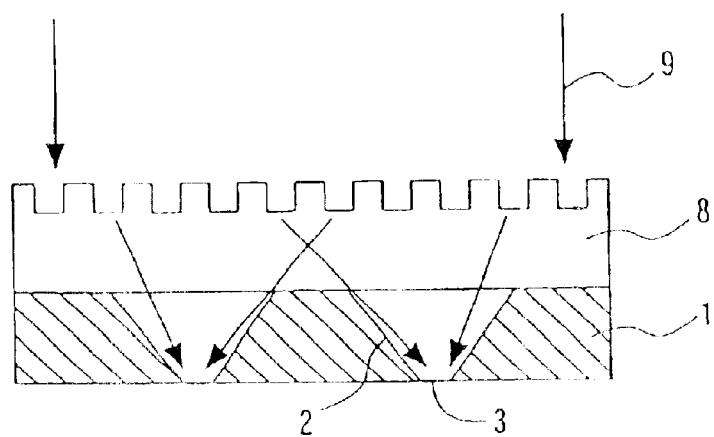
FIG. 5 is a sectional view of a near-field optical probe arranged with a holographic lens in Embodiment 3 of the present invention.

Incidentally, a holographic lens 8 may be used as shown in FIG. 5, in place of the Fresnel zone plate 7. The holographic lens 8 is a hologram formed such that a diffraction spot corresponds to the aperture 3, and can collect in the aperture 3 light from a light source, preferably light incident from coherent light 9. This holographic lens, if a master is made, it can be also fabricated on a mass production basis by stamping or the like.

Furthermore, in the above explanation the Fresnel zone plate 7 or the holographic lens 8 are arranged on the top surface of the silicon substrate 1. They may alternatively be formed within the taper portion 2 formed in the silicon substrate 1. In this case, a light source, e.g. a surface emitting laser is arranged on the top surface of the silicon substrate 1.

[Embodiment 4]

Figure 6:
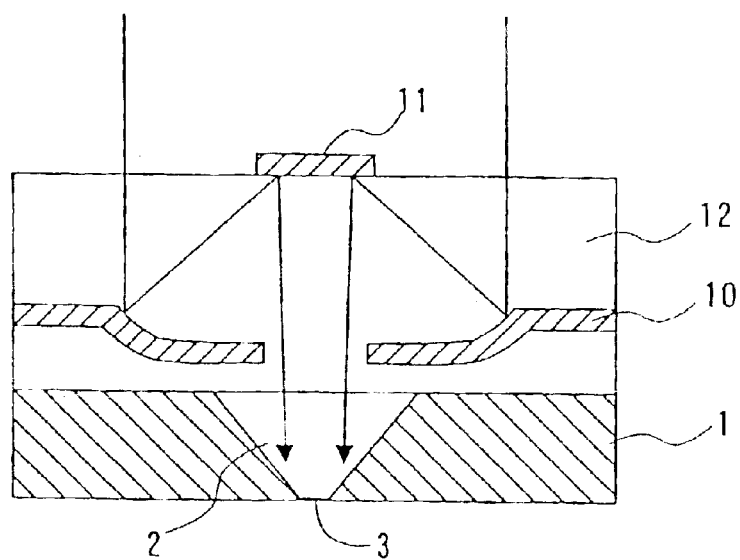
FIG. 6 is a sectional view of a near-field optical probe according to Embodiment 4 of the present invention.

FIG. 6 shows a sectional view of one part of a near-field optical probe according to Embodiment 4.

In FIG. 6, a structure having a parabolic mirror 10, a mirror 11 and a light transmission member 12 is arranged in place of the planar microlens 5 of FIG. 1 explained in Embodiment 1. The incident light to the light transmission member 12 is efficiently reflected upon the parabolic mirror 10 to the mirror 11. The light directed to the mirror 11 is collected toward the aperture 3. This can increase the intensity of a near field to be generated in the aperture.

[Embodiment 5]

Figure 7:
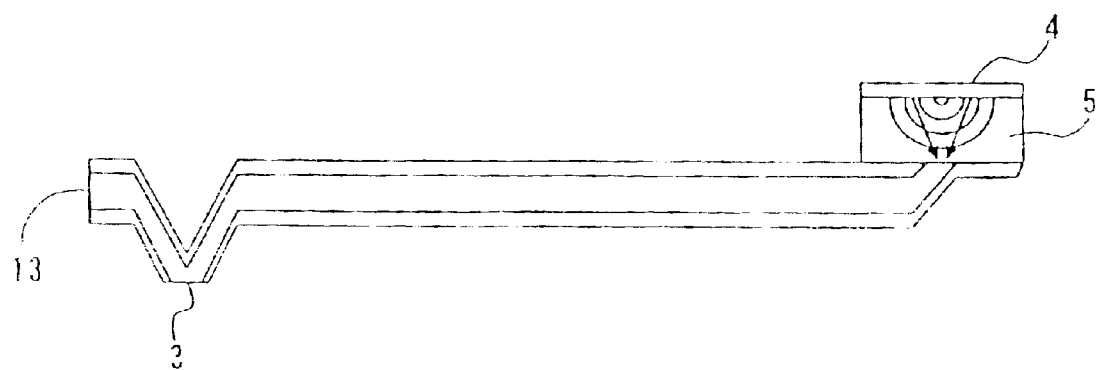
FIG. 7 is a sectional view of a near-field optical probe using a cantilever type optical waveguide probe in Embodiment 5 of the present invention.

FIG. 7 shows a sectional view of a near-field optical probe according to Embodiment 5.

In FIG. 7, an optical waveguide for a cantilever type optical waveguide probe is arranged in place of the silicon substrate 1 of FIG. 1 explained in Embodiment 1. The optical waveguide 13 has a light incident surface on which the planar microlens 5 as explained in Embodiment 1 is arranged in contact therewith. The planar microlens 5 has a surface emitting laser 4 as a light source arranged on a top surface thereof. This can achieve more intensive light collection and lossless light introduction to the optical waveguide as compared to the conventional structure implemented by a usual lens optical system, thus efficiently creating a near field in the aperture 3. This case is suited for use as an optical probe for a near-field optical microscope rather than use as an optical memory head.

Figure 8:
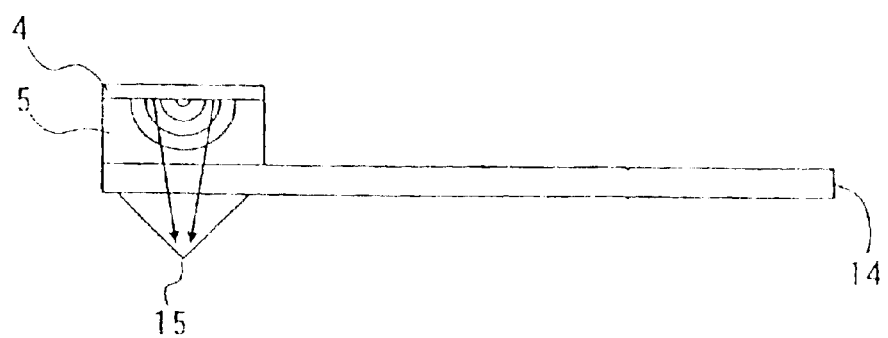
FIG. 8 is a sectional view of a near-field optical probe using a cantilever type optical probe in Embodiment 5 of the present invention.
Figure 9:
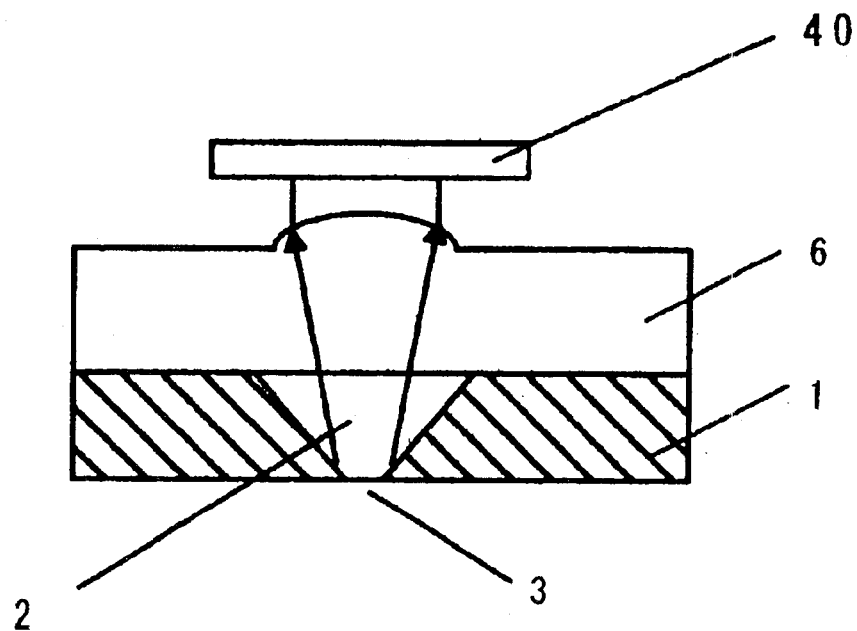
FIGS. 9–14 are sectional views of modified forms of the near-field optical probes according, to Embodiments 2–5.
Figure 10:
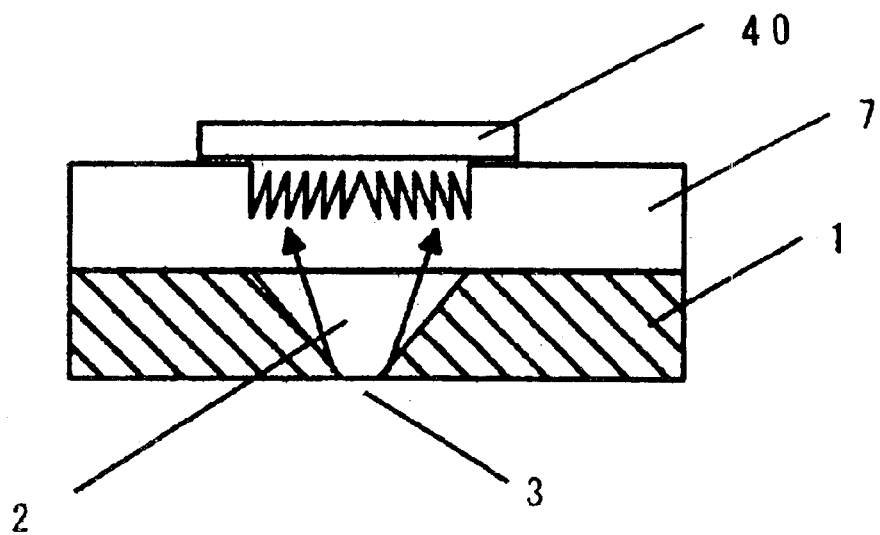
Figure 11:
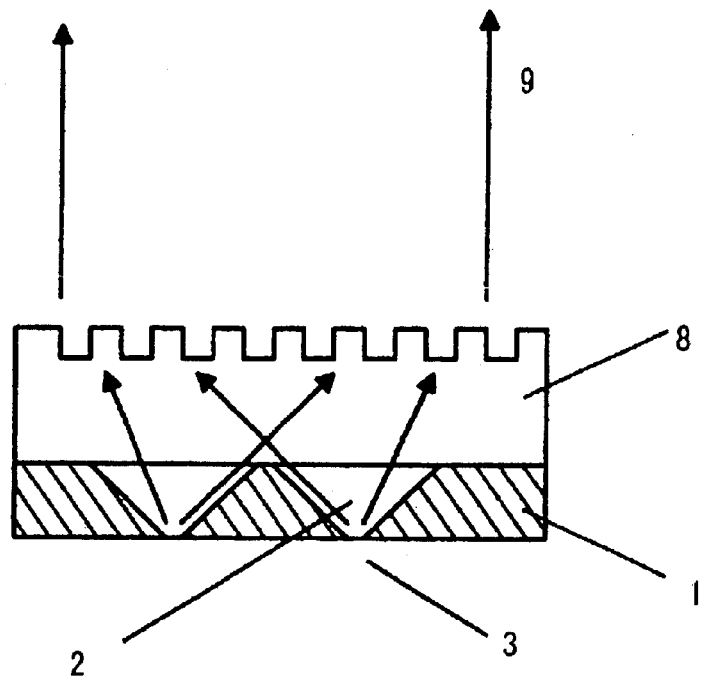
Figure 12:
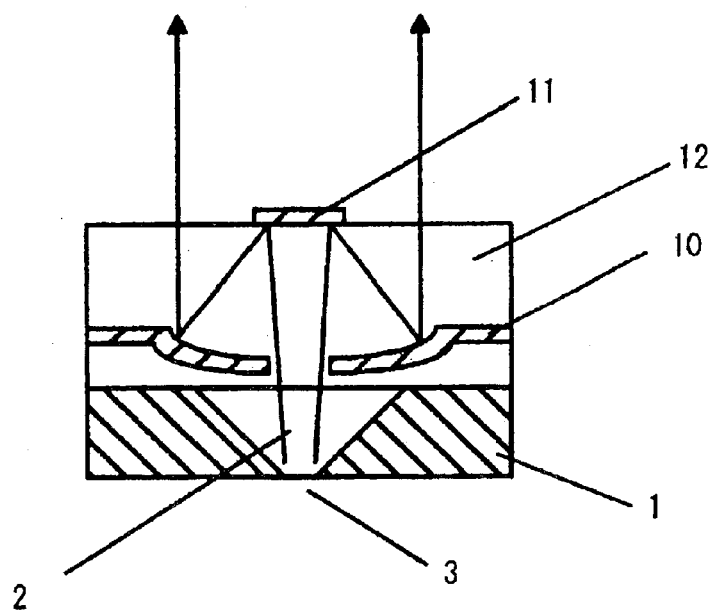
Figure 13:
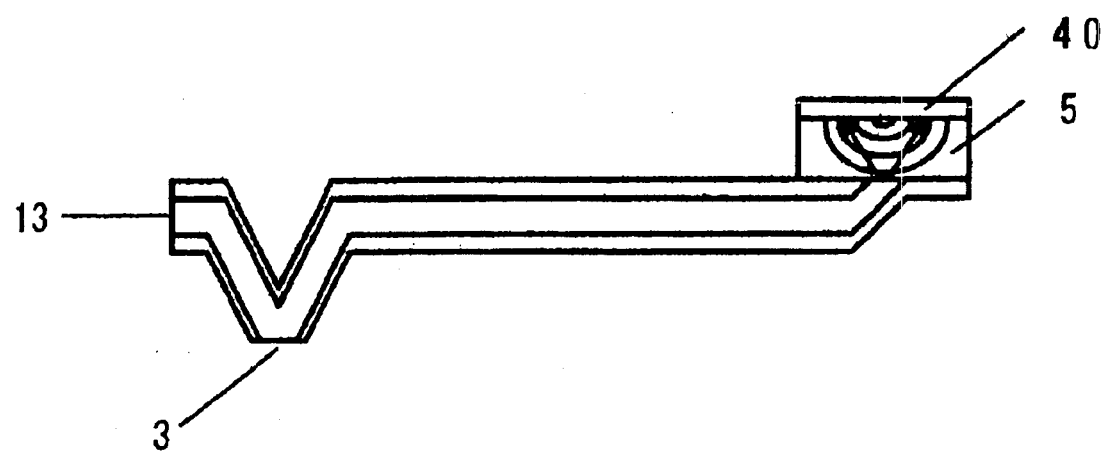
Figure 14:
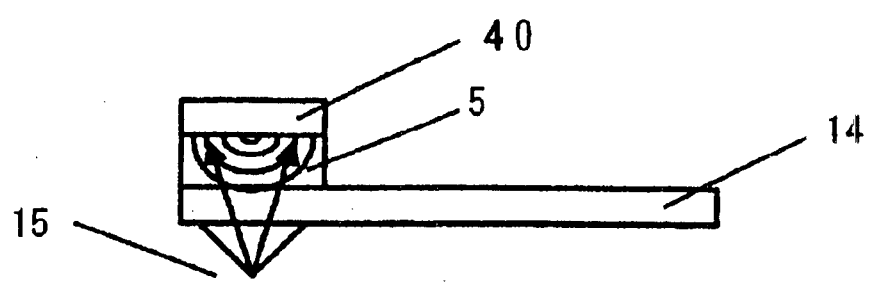

Also, also in a cantilever type optical probe 14 provided at a tip with a projection 15 as an aperture as shown in FIG. 8, the provision of a structure having a planar microlens 5 and surface emitting laser 4 provided above the projection 15 can achieve intensive light collection and loss less light introduction to the projection 15 to efficiently generate a near field in the aperture, as in the case of the cantilever type optical waveguide probe. This case is also suited for use as an optical probe for a near-field optical microscope rather than use as an optical memory head.

Incidentally, in Embodiment 5, the planar microlens 5 may be structured by a microlens substrate 6, Fresnel zone plate 7 and holographic lens 8 or a parabolic mirror 10, mirror 11 and light transmission member 12 explained in Embodiment 4.

In Embodiments 1–5 explained above, the light source was a surface emitting laser. It is however possible to overlay in order a laser diode or LED on the lens substrate positioned underneath by the conventional silicon process.

FIGS. 9–14 are sectional views similar to FIGS. 3–8, respectively, showing modified forms of near-field optical probes which function in the collection mode and detect near-field light passing through the aperture 3. The near-field optical probes shown in FIGS. 9–14 have the same construction as those shown in FIGS. 3–8 except that a photodetector 40 is used in place of the surface emitting laser 4.

INDUSTRIAL APPLICABILITY

As explained above, according to the present invention, the light given by a light source can be efficiently collected to a microscopic aperture by a planar lens positioned above the microscopic aperture. A near-field optical probe can be provided which can generate a near field with higher intensity as compared to the conventional optical probe but is compact in structure.

Also, if a plurality of microscopic aperture and planar lens portions positioned thereon are provided, a near-field optical probe can be provided which is suited for use as an optical memory head realizing optical memory information recording utilizing a near field, particularly without high speed scan and trackingless.

Also, planar lens surface flatness is offered by making the planar lens with a gradient refractive index. Because a light source to be placed above that can be closely arranged. Accordingly an optical probe can be provided which is compact and capable of manufactured on a mass production basis.

Also, the planar lens made with a gradient refractive index offers surface planarization for the planar lens. The above-positioned light source can be placed at a nearby position. Accordingly, an optical probe can provided which is more compact and possible to mass-produce.

Also, the planar lens made having a lens spherical surface provides a usual lens effect in a microscopic region. An optical probe can be provided which is compact but capable of being mass producible.

Also, the planar lens made in a lens utilizing diffraction, optical axis adjustment after planar lens installation can be omitted. Further, an above-positioned light source can be placed at a nearby position. Accordingly, a near-field optical probe can be provided which is compact but capable of mass producible.

Also, further a near-field optical probe can be provided with higher compactness by placing the planar lens within an inverted conical or pyramidal hole.

Also, a technology cultivated in the conventional cantilever type optical probe can be utilized by arranging, in place of the plate substrate, a cantilever formed with an optical waveguide having a microscopic aperture in a projecting portion wherein the planar lens is arranged adapted for light incident plane of the optical waveguide.

Also, a near-field optical probe can be provided which is capable of creating a near field with higher intensity as compared to the conventional optical probe, by efficiently collecting the light given by a light source to the microscopic aperture through a light collecting layer positioned above the microscopic aperture.

Also, a technology cultivated in the conventional cantilever type optical probe can be utilized by arranging, in place of the plate substrate, a cantilever formed with an optical waveguide having a microscopic aperture in a projecting portion, wherein light collecting layer is arranged adapted for light incident plane of the optical waveguide.

Also, if the light source is changed to a light detector to detect scattering light scattered in the microscopic aperture, the scattering light given by the microscopic aperture can be efficiently supplied to a light detector by a planar lens or light collecting layer positioned above the microscopic aperture. A near-field optical probe can be provided which can efficiently detect a near field with less cross-talk as compared to the conventional optical probe but is compact in structure.

What is claimed is:

1. An optical probe comprising: a flat support member having opposed flat surfaces and a via hole with a tapered sidewall penetrating therethrough and terminating at one of the flat surfaces of the support member in a narrow aperture so that there is no projection in the vicinity of the narrow aperture; and a light detecting device disposed on the support member for collecting light passing through the narrow aperture.

2. An optical probe according to claim 1; wherein the light detecting device comprises a photodetector and a lens for focusing light passing through the narrow aperture.

3. An optical probe according to claim 2; wherein the lens comprises a planar lens having a surface abutting the other of the flat surfaces of the support member and having a microscopic lens portion for focusing light passing through the narrow aperture.

4. An optical probe according to claim 3; wherein the lens has a gradient refractive index in which the index of refraction continuously varies to collimate light passing through the narrow aperture.

5. An optical probe according to claim 3; wherein the microscopic lens portion focuses light and has the narrow aperture as a focal point.

6. An optical probe according to claim 1; wherein the light detecting device comprises a photodetector and a planar lens disposed adjacent to the other of the flat surfaces of the support member and having a focal point located at the narrow aperture.

7. An optical probe according to claim 1; wherein the light detecting device comprises a photodector and a Fresnel zone plate for focusing light passing through the narrow aperture onto the photodetector.

8. An optical probe according to claim 1; wherein the light detecting device comprises a photodetector and a holographic lens for focusing light passing through the narrow aperture onto the photodetector.

* * * * *